US006911240B2

(12) United States Patent
Kondoh

(10) Patent No.: US 6,911,240 B2
(45) Date of Patent: Jun. 28, 2005

(54) FIXING MEMBER, METHOD FOR PRODUCING IT, AND IMAGE FORMING APPARATUS COMPRISING THE FIXING MEMBER

(75) Inventor: Tsuneaki Kondoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 5 days.

(21) Appl. No.: 10/639,650

(22) Filed: Aug. 13, 2003

(65) Prior Publication Data

US 2004/0069404 A1 Apr. 15, 2004

(30) Foreign Application Priority Data

Aug. 20, 2002 (JP) ....................................... 2002-239242

(51) Int. Cl.$^{7}$ ........................... B32B 1/08; B32B 25/08; B32B 25/20; G03G 15/20

(52) U.S. Cl. .................. 428/35.9; 428/36.91; 428/421; 428/447; 428/448; 428/457; 428/473.5; 428/474.4; 428/906; 399/320; 399/333; 492/54

(58) Field of Search ................................ 399/320, 333; 492/54; 428/35.9, 36.91, 421, 422, 447, 448, 457, 473.5, 474.4, 906

(56) References Cited

U.S. PATENT DOCUMENTS 4,810,564 A * 3/1989 Takahashi et al. .......... 428/213

FOREIGN PATENT DOCUMENTS

JP 10-148988 2/1998

* cited by examiner

*Primary Examiner*—Ramsey Zacharia
(74) *Attorney, Agent, or Firm*—Oblon, Spivak, McClelland, Maier & Neustadt, P.C.

(57) ABSTRACT

In a fixing member (10) in which an elastic layer made of heat-resistance synthetic rubber and a releasing layer made of fluorocarbon resin are sequentially provided on a substrate, a melting point of the fluorocarbon resin constituting the releasing layer (3) is set to be at least 20° C. lower than a temperature for starting an oxidation of the heat-resistance synthetic rubber constituting the elastic layer (2), and the releasing layer (3) is baked at a temperature which is higher than the melting point of the fluorocarbon resin constituting the releasing layer (3), and a baking temperature which does not exceed the starting temperature for the oxidation of the heat-resistance rubber constituting the elastic layer (2).

19 Claims, 4 Drawing Sheets

FIXING MEMBER, METHOD FOR PRODUCING IT, AND IMAGE FORMING APPARATUS COMPRISING THE FIXING MEMBER

BACKGROUND OF THE INVENTION

1. Field of the Invention

The present invention relates to a fixing member such as a roller, a sheet, an endless belt, or the like, which is used for an image forming apparatuses such as an electro-photography copying machine, a laser printer, a facsimile, and so on, and the image forming apparatus, which comprises the fixing member.

2. Description of the Prior Art

FIG. 3 is an explanatory view showing an image forming apparatus of a conventional electro-photography type. In the image forming apparatus of the conventional electro-photography type 100, for example, a copying machine and a laser printer have a photoconductor drum 101 in which an electrostatic latent image is formed on a surface, an electrification roller 102 in which an electrification treatment is conducted by contacting to the photoconductor drum 101, exposure means 103 such as a laser beam, and so on, a development roller 104 in which a toner is adhered to the electrostatic latent image formed on the photoconductor drum 101, a power-pack 105 in which a DC voltage is applied on the electrification roller 102, a transfer roller 106 in which a toner image formed on the photoconductor drum 101 is copied on a detail paper 107, a cleaning device 108 in which the photoconductor drum 101 of after transfer treatment is cleaned, a surface electrometer 109 in which an electro potential of the surface of the photoconductor drum 101 is measured, and a thermal fixing device of roller process 110 composing of a thermal fixing roller 111 and a pressurization roller 112.

In this conventional image forming apparatus 100, the electrostatic latent image is formed by exposing with the exposure means 103 after equally charged by the electrification roller 102 on a photoconductor layer on the surface of the rotated photoconductor drum 101. A toner image is created by a development of this electrostatic latent image adhered the toner thereto. Then this toner image is transferred to the detail paper 107. Moreover, the toner image is thermal fixed in such a manner that the detail paper 107 in which the toner image is transferred is passed through the thermal fixing device 110 of roller process composing of the heat fixing roller 111 and the pressurization roller 112.

In the thermal fixing device 110, the heat-fixing roller 111 is used. The heat fixing roller 111 is provided with a releasing layer composing of fluorocarbon resin such as tetrafluoroethylene resin (PTFE), tetrafluoroethylene perfluoroalklvinyleter copolymer resin (PFA), tetrafluoroethylene hexafluoropropylene copolymer resin (FEP), and so on, which are coated in order to prevent adhesion of the toner to a peripheral surface of a core formed from a hollow cylinder of a metal such as aluminum, and so on. The releasing layer is provided to separate the toner from the roller.

In the heat-fixing roller 111, a hollow portion of the core is provided with a heater such as a halogen lump, and so on along a line of a rotation center. The heat-fixing roller 111 is heated from an inside by radiant heat. When the detail paper 107 is passed through between the heat fixing roller 111 and the pressurization roller 112, the toner, which is adhered to the detail paper 107, is fixed on the detail paper 107 in such a manner that the toner is soften and pressured by the heat of the heat fixing roller 111.

Four colors of toners such as red (magenta), blue (cyan), yellow (yellow), and black (black) are used for the conventional image forming apparatuses such as a full color copying machine, the laser printer, and so on, and these colors of toners are overlapped, and then transferred on a paper.

Consequently, when an unfixed color toner layer is fixed, it is necessary for each toner layer to be developed colors as a transparency condition by melting. Sufficient melting of the toner is necessary for improving a transparency performance of an OHP film. When a surface of the toner layer is roughed, the transparency performance of the OHP film is declined with declining glossiness. Therefore the surface of the toner layer is required to be smoothed. Moreover, if the unfixed toner layer causes a misalignment and so on at the time of fixing, the image becomes unclear. Therefore, the toner layer should be flexibly and equally pressed on the paper and equally fixed by the fixing member. As mentioned above, the color toner is adapted to generate a sharp-melt property of material by lowering a softening temperature and the transparency performance of the OHP film so that an offset is easy to be generated by adhering to the surface of the fixing member. Consequently, beside heat-resistance, special characteristics such as flexibility, the releasability of the fixing member from the toner, endurance, and so on are required for the fixing member.

However, the heat fixing roller in which the core (i.e. a substrate) is provided with a layer of fluorocarbon resin is advantageous for the releasability, but it is disadvantageous for the flexibility, elasticity, and so on. Therefore the heat fixing roller can not correspond to the image forming apparatus such as the full-color copying machine, a full-color laser printer, and so on.

In order to provide the flexibility on the surface layer of this thermal fixing roller, a heat fixing roller in which the core is provided with an elastic layer composing of heat-resistance synthetic rubber such as silicone rubber, fluorine-contained rubber, or the like is proposed.

Provided the elastic layer on the core in this way, the equal fixing for a black-and-white image can be accomplished. Moreover, in case of a full-color image, it is possible for a plurality of the color toners to be melted and mixed equally so that various characteristics of an image quality such as the glossiness and the fixing are improved.

A method of fixing the thermal roller is capable of maintaining a whole heat roller at predetermined temperature, and also it is suitable for speeding up of a printing speed due to a large heat capacity of the heat roller. However, there were problems such that a considerable time to heat the heat roller till predetermined time is required and also an electric power consumption to heat the whole heat roller is increased.

Consequently, an effort for saving of energy is encouraged recently, and shortening of a rising time is considered. As a measure for that, a belt type fixing device to heat the toner on the detail paper through a film typed endless belt heated by the heater is proposed.

FIG. 4 is an explanation view for a conventional fixing device of belt type. As shown in FIG. 4, the image forming apparatus of conventional electro-photography process comprises a fixing belt 113 rotatably provided by a heat roller 115 and a fixing roller 114, and also a belt type thermal fixing device 117, which comprises a pressurization roller 116 provided as contacting to the fixing roller 114 through this fixing belt 113.

In this belt type thermal fixing device 117, the detail paper 107 is passed through between the fixing belt 113 heated by the heat roller 115 and the pressurization roller 116, and then the toner adhered to the detail paper 107 is fixed on the detail paper in such a manner that the toner is softened by the heat of the fixing belt 113 and is pressured by the pressurization roller 116.

In this belt type thermal fixing device 117, the thin film typed fixing belt 113 is directly heated so that the heated portion reaches to the predetermined time in short time after power is applied. Therefore a waiting time after the power is applied can be reduced. Moreover, it is advantageous in that only required portion is heated so that the electric power consumption is small.

Conventionally, in this kind of the fixing belt 113, a belt in which an elastic layer (not shown) composed of the rubber is formed on a surface of a substrate (not shown) has been adopted. For the fixing belt 113, a method for impregnating the surface with the silicone oil for the releasablity has been adapted.

However this method includes problems as follows;

① a user maintenance such as a replenishment of the silicon oil is required.

② a cost is increased by attaching a system of the replenishment of the silicone oil.

③ a the silicone oil is adhered to the transfer paper so that a pen is not able to be used to write on the transfer paper.

According to the above-mentioned problems, a fixing belt, which does not use the silicone oil, is required.

Therefore, as the fixing belt, which does not use the silicone oil, a composition of the fixing belt in which the releasing layer is formed on the surface of the elastic layer of the above-mentioned fixing belt, is proposed. As materials to compose this releasing layer, fluorocarbon resin such as tetrafluoroehylene resin (PTFE), tetrafluoroehylene-perfluoroalkylvinyleter copolymer resin (PFA), tetrafluoroethylene-hexafluoropropulene copolymer resin (FEP), and so on have been used.

As described above, there are many kinds of the fixing materials such as the fixing roller and the fixing belt in which the releasing layer on the surface of the elastic layer is provided; however, some of these fixing members include a formation of the releasing layer in such a manner that the surface of the substrate is coated with the heat-resistance synthetic rubber such as silicon rubber to form the elastic layer, and then the surface of the elastic layer is coated with fluorocarbon resin of dispersion liquid (drainage texture dispersion paint) or powdered paint, then the releasing layer is formed by heating baking this paint above a melting point to form a film.

However, the melting point of the fluorocarbon resin, which composes the aforementioned releasing layer, is 327° C. for PTFE, 310° C. for PFA, and 275° C. for FEP. These are high temperature. Therefore, for the conventional fixing roller and the fixing belt, when the releasing layer is formed by baking the fluorocarbon resin with above-mentioned high temperature, depending on a combination with the heat-resistance synthetic rubber composing the inside layer of the elastic layer of the releasing layer, there is a problem of generating a crack on the elastic layer by oxidizing and deteriorating this heat-resistance synthetic rubber.

When the crack is generated on the elastic layer as this, there were problems that a surface quality of the fixing member is lost, and the toner is remained in a part of the crack generated on the surface of the fixing member, and as a result, defects such as an image fixing fault, and so on are generated by a stained image and an unevenness of a surface. When loads such as jamming of the transfer paper, a contact of a removed pawl, and so on are imposed, only the releasing layer is peeled so that the melted toner is not able to be released. As a result, there is a problem that the transfer paper is wound around the fixing roller.

In order to avoid the problems of the surfaces of these fixing members, recently, for example, as shown in Japanese Patent Laid-Open Hei 10-148988, a fixing roller that after the core; i.e. the substrate is inserted into a tube of fluorocarbon resin, the fixing roller is formed by casting the heat-resistance synthetic rubber such as the silicone rubber and so on into between the tube of fluorocarbon resin and the substrate is proposed. In this fixing roller, the tube of fluorocarbon resin is created separately so that it is not necessary to higher the temperature of the heat-resistance synthetic rubber constituting the elastic layer, and it is advantageous in that the deterioration of the heat-resistance synthetic rubber can be prevented.

However, there is a limit for thinning a film for the tube of fluorocarbon resin. Therefore, the fixing roller produced by this method becomes a hard fluorocarbon resin layer of a thick film, and the flexibility of required characteristic is lost, and problems such as generating unevenness of brilliance on the toner surface and unevenness of image on the OHP are caused.

SUMMARY OF THE INVENTION

In order to solve the problems of above prior art, an object of the present invention is to provide a fixing member without having defects such as a stained image, an unevenness of an image, an unevenness of glossiness, an image fixing defect, winding of a transfer paper, and so on, which are caused by a crack on an elastic layer at the time of heating and forming a film of fluorocarbon resin constituting a releasing layer generated by oxidation and deterioration of heat-resistance synthetic rubber constituting the elastic layer, which is the inside layer of the releasing layer, and a method for producing it, and also to provide an image forming apparatus, which comprise the fixing member, with a low cost.

In order to achieve the objects above-mentioned, according to a first feature of the present invention, in a fixing member in which an elastic layer made of a material including heat-resistance synthetic rubber and a releasing layer made of a material including fluorocarbon resin are sequentially provided on a substrate, a melting point of the fluorocarbon resin constituting the elastic layer is set to be at least 20° C. lower than a temperature for starting an oxidation of the heat-resistance synthetic rubber constituting the elastic layer, and the releasing layer is baked at a temperature, which is higher the melting point of the fluorocarbon resin, and also a baking temperature, which does not exceed the starting temperature for the oxidation of the heat-resistance rubber constituting the elastic layer.

According to a second feature of the present invention, in the fixing member as defined in the first feature, a major component of the heat-resistance synthetic rubber constituting the elastic layer is silicone rubber or fluorosilicone rubber.

According to a third feature of the present invention, in the fixing member as defined in the first feature, the fluorocarbon resin constituting the releasing layer has a melting point in a range of 270° C. to 285° C.

According to a fourth feature of the present invention, in the fixing member as defined in the first and feature, the fluorocarbon resin constituting the releasing layer has a melting point in a range of 245° C. to 280° C.

According to a fifth feature of the present invention, in the fixing member as defined in the first feature, the fluorocarbon resin constituting the releasing layer has a melting point in a range of 278.9° C. to 287.2° C.

According to a sixth feature of the present invention, in the fixing member as defined in the first feature, the fluorocarbon resin constituting the releasing layer has a melting point below 220° C.

According to a seventh feature of the present invention, in the fixing member as defined in the first feature, a melt flow rate (MFR) of the fluorocarbon resin constituting the releasing layer is more than 3 (grams per ten minutes).

According to a eighth feature of the present invention, the fixing member as defined in the first feature, the releasing layer is baked at a temperature, which is at least 20° C. higher than the starting temperature of the oxidation constituting the releasing layer.

According to a ninth feature of the present invention, the fixing member as defined in the first feature, a substrate is a roller made of a metal material such as aluminum, stainless-steel, brass, iron, or the like.

According to a tenth feature of the present invention, the fixing member as defined in the first feature, the substrate is formed by any of a sheet or an endless belt made of a metal material such as stainless-still, nickel, or the like, a sheet or an endless belt made of heat-resistance resin such as polyimide, polyamideimide, or the like, or a laminated sheet or an endless belt made of the sheet or the endless belt which formed from said metal material, and the sheet or the endless belt, which is made of the heat-resistance resin According to a eleventh feature of the present invention, in a method for producing the fixing member, following processes are included: a process for forming a first primer layer by applying a first primer on the substrate; a process for forming the elastic layer by applying solution of heat-resistance synthetic rubber on the first primer layer; a process for forming a second primer layer by applying a second primer on the elastic surface; a process for forming a paint layer of fluorocarbon resin by applying dispersion liquid or powdered paint in which a melting point is at least 20° C. lower than a starting temperature for the oxidation of heat-resistance synthetic rubber constituting the elastic layer and powdered paint on the second primer layer; and a process for baking said paint layer of fluorocarbon resin with a temperature of above the melting point of said fluorocarbon resin and also a baking temperature, which does not exceed the starting temperature for the oxidation of the heat-resistance synthetic rubber constituting said elastic layer.

According to a twelfth feature of the present invention, an image forming apparatus comprises a fixing member in which an elastic layer made of heat-resistance synthetic rubber and a releasing layer made of fluorocarbon resin are sequentially provided on a substrate, and a melting point of the fluorocarbon resin constituting the releasing layer is set to be at least 20° C. lower than a starting temperature for the oxidation of the fluorocarbon resin constituting the releasing layer, and the releasing layer is baked at a temperature, which is higher than the melting point of the fluorocarbon resin and a baking temperature, which does not exceed the starting temperature for the oxidation of the heat-resistance synthetic rubber constituting the elastic layer.

DETAILED DESCRIPTION OF THE PREFEREED EMBODIMENTS

Embodiments of the present invention will be described referring to the accompanying drawings below.

Figure 1B:
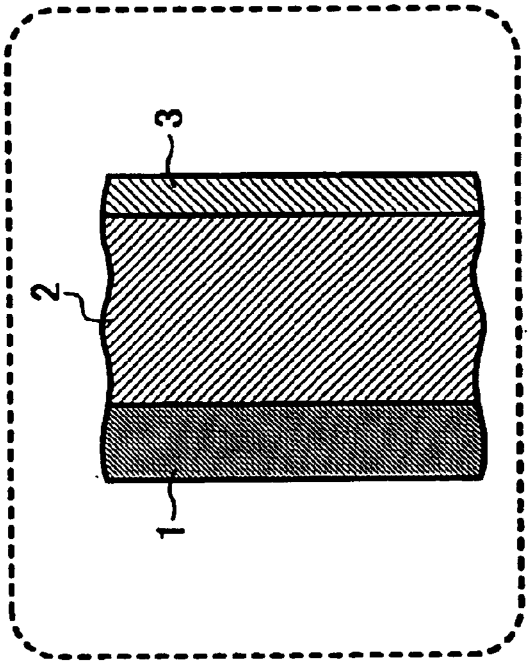
FIG. 1B is an enlarged cross-section view of a part surrounded by a dotted line in FIG. 1A.
Figure 1A:
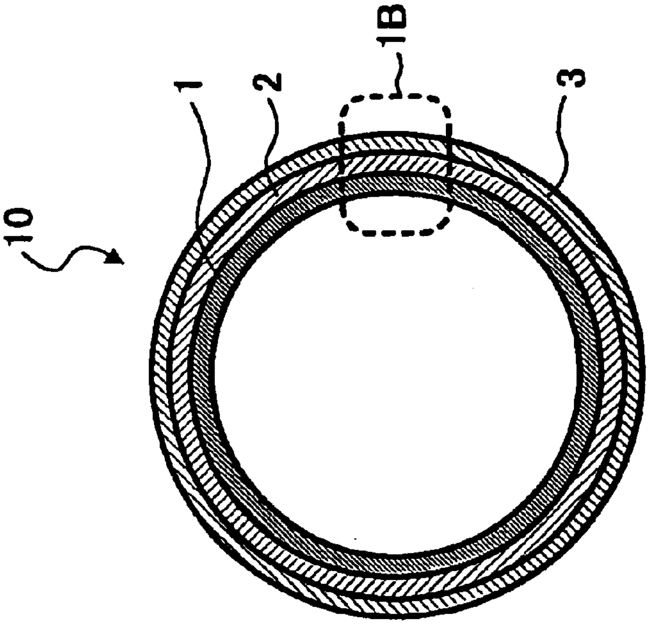
FIG. 1A is a cross-section view of a fixing roller showing an embodiment of the present invention.

In FIG. 1, reference numeral 10 denotes a fixing roller (a fixing member). The fixing roller 10 is sequentially provided with an elastic layer 2 composing of heat-resistance synthetic rubber and a releasing layer 3 composing of fluorocarbon resin on a substrate 1.

A melting point of the fluorocarbon resin composing of the releasing layer 3 is set to be at least 20° C. lower than a starting temperature for the oxidation of the heat-resistance synthetic rubber constituting the elastic layer 2, and the releasing layer 3 is baked at a temperature, which is higher than the melting point of the fluorocarbon resin constituting the releasing layer 3, and a baking temperature, which does not exceed the starting temperature for the oxidation of the heat-resistance synthetic rubber constituting the elastic layer 2.

According to the present invention, the melting point of the fluorocarbon resin constituting the releasing layer 3 is set to be at least 20° C. lower than the starting temperature for the oxidation of the heat-resistance synthetic rubber, and the releasing layer 3 is baked at the temperature, which is higher than the melting point of the fluorocarbon resin constituting this releasing layer 3, and the baking temperature, which does not exceed the starting temperature for the oxidation of the heat-resistance synthetic rubber constituting the elastic layer 2. Therefore, a crack on the elastic layer 2 generated by a deterioration of the heat-resistance synthetic rubber constituting the elastic layer 2 is able to be prevented. Moreover, generations of problems such as a defect of image fixing by a stained image, an unevenness of a surface, and so on can be prevented, and winding of a transfer paper can be prevented as well.

Figure 2:
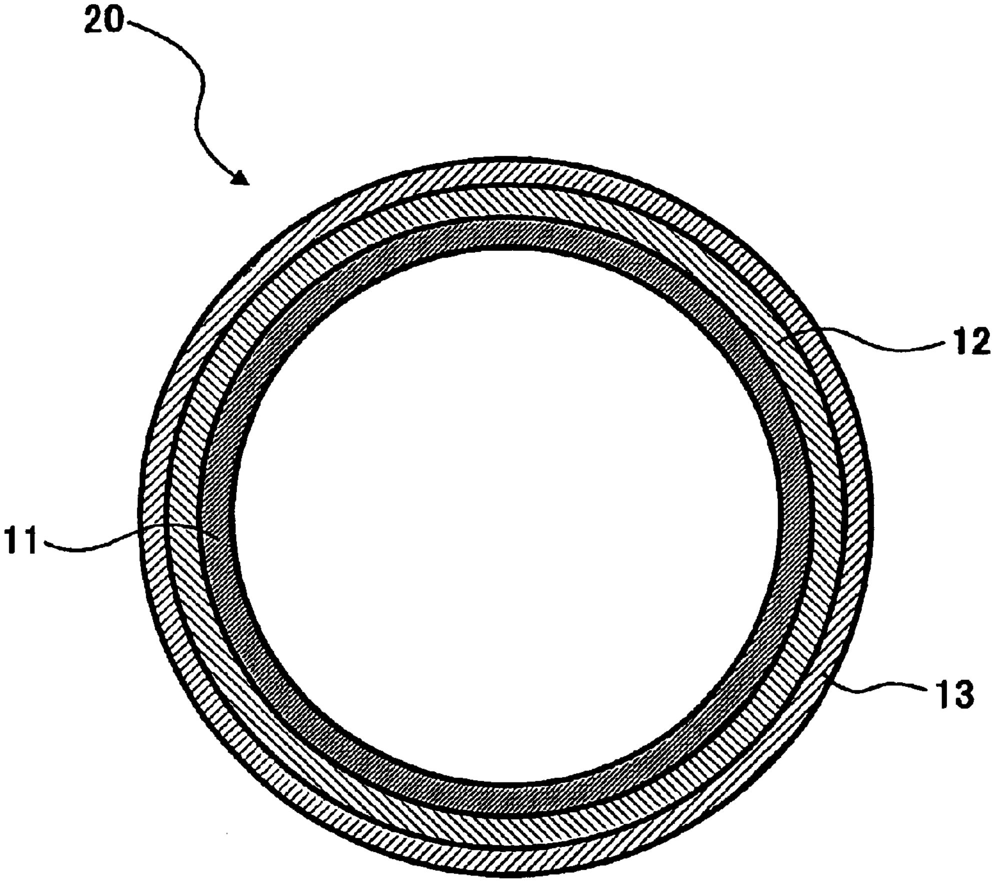
FIG. 2 is a cross-section view of a fixing belt showing another embodiment of the present invention.

In FIG. 2, reference numeral 20 is a fixing belt (the fixing member). For the fixing belt 20, there are sequentially provided with an elastic layer 12 composing of the heat resistant synthetic rubber and a releasing layer 13 composing of the fluorocarbon resin on a substrate 11.

A melting point of the fluorocarbon resin constituting the releasing layer 13 is set to be at least 20° C. lower than a starting temperature for the oxidation of the heat-resistance synthetic rubber constituting the elastic layer 12, and the releasing layer 13 is baked at a temperature, which is higher than the melting point of the fluorocarbon resin constituting this releasing layer 13, and the baking temperature, which does not exceed an oxidization starting temperature of the heat-resistance synthetic rubber constituting the elastic layer 12.

For the heat-resistance synthetic rubber constituting the elastic layers 2 and 12, a temperature of at the time of fixing is about 200° C. Therefore it is preferable for the heat-resistance synthetic rubber to use a rubber having a major component of silicone rubber or fluorosilicone rubber, which comprises the heat-resistance enduring the temperature. However, it is possible to use the other heat-resistance synthetic rubber beside the above, which endures the temperature, unless it departs from the object of the present invention.

For the fluorocarbon resin composing the releasing layers 3 and 13, it is preferable for the fluorocarbon resin to be composed of selecting from below ① to ⑨.

① Tetrafluoroethylene resin (PTFE)

② Tetrafluoroethylene.Perfluoroalkyvinyleter copolymer resin (PFA)

③ Tetrafluoroethylene.Hexafluoropropylene copolymer resin (FEP)

④ Mixture of the fluorocarbon resin of above ① to ③.

⑤ Resin in which the fluorocarbon resin of above ① to ③ is dispersed into the heat-resistance resin.

⑥ Tetrafluoroethylene.Ethylene copolymer resin (a copolymer mole ration: 60/40~40/60)

⑦ Tetrafluoroethylene.Ethylene-Hexafluoropropylene-Perfluoro (alkylvinylether) macro vinylmonomer (a copolymer mole ratio: 55~30/60~40/10~1.5/2.5~0.05)

⑧ Mixture of FEP and PFA (a mixture ratio: 80/20~20/80)

⑨ There is provided a partially crystalline melt-processable copolymer containing a major composing of tetrafluoroethylene and ethylene and a minor portion consisting of at least one perfluoro (alkylvinylether), wherein the alkyl has 1–5 carbon atoms and optionally a selected fluoroalkylethylene where the fluoroalkyl is of 2–10 carbon atoms. The minor portion is present in an amount effective to give a melting point of 220° C. or below to the copolymer (Japanese Patent Laid-Open Hei11-343314).

It is preferable for the fluorocarbon resin composing the releasing layers 3 and 13 to have the melting point of a range from 270° C. to 285° C. (fluorocarbon resin of ⑥), the melting point of a range from 245° C. to 280° C. (fluorocarbon resin of ⑦), the melting point of a range from 254.7° C. to 287.2° C. (fluorocarbon resin of ⑧), and the melting point of below 220° C. (fluorocarbon resin of ⑨).

It is preferable that a melt flow rate (MFR) of the fluorocarbon resin constituting the releasing layers 3 and 13 is more than 3 (grams per ten minutes). When the melt flow rate (MFR) of the fluorocarbon resin constituting the releasing layers 3 and 13 is more than 3 (grams per minutes), flat surfaces of the releasing layers 3 and 13 are able to be formed by ensuring a good film formation performance, and it is possible to prevent generation of defects such as an image defect, and so on.

Moreover, it is preferable for the releasing layers 3 and 13 to be baked at a temperature at least 20° C. higher than a temperature for starting a melting of the fluorocarbon resin constituting the releasing layers 3 and 13. When the releasing layers 3 and 13 are baked at a temperature at least 20° C. higher than the starting temperature for the melting of the fluorocarbon resin constituting the releasing layers 3 and 13, particles of the fluorocarbon resin are melted and bonded closely. Therefore, the surface quality is further improved so that the generation of the defects such as the image defect, and so on arc further prevented.

It is preferable for the substrate 1 to be a cylindrical roller, which is made of a metal material such as aluminum, stainless-steel, brass, iron or the like. Moreover, it is preferable for the substrate 11 to be ① a sheet or an endless belt, which compose of the a metal material such as stainless-steel, nickel, or the like, ② a sheet or an endless belt, which compose of the heat-resistance resin such as polyimide, polyamideimide, or the like, or ③ a laminated sheet or an endless belt of ① and ②.

It is preferable for above-mentioned sheet or endless belt to have a film thickness of 100 μm considering flexibility thereof. Moreover, it is preferable for the heat-resistance resin to have the film thickness of 20 to 200 μm in terms of shortening of the rising time thereof and the film thickness thereof.

A method for producing a fixing member according to the present invention comprises processes as follows.

① a process for forming a first primer layer by applying a first primer on the substrate.

② a process for forming the elastic layer by applying solution of the heat-resistance synthetic rubber on the first primer layer.

③ a process for forming a second primer layer by applying a second primer on the elastic layer.

④ a process for forming a paint layer of fluorocarbon resin by applying dispersion liquid or powdered paint of the fluorocarbon resin in which the melting point is at least 20° C. lower than the starting temperature for the oxidation of the heat-resistance synthetic rubber constituting the elastic layer on the second primer layer.

⑤ a process for baking the paint layer of the fluorocarbon resin by the temperature, which is higher than the melting point of the fluorocarbon resin, and the baking temperature, which does not exceed the starting temperature for the oxidation of the heat-resistance synthetic rubber constituting the elastic layer.

According to the method for the fixing member of the present invention, the above-mentioned process ④, i.e. the process for forming the paint layer of the fluorocarbon resin by applying dispersion liquid or powdered paint of the fluorocarbon resin in which the melting point is at least 20° C. lower than the starting temperature for the oxidation of the heat-resistance synthetic rubber constituting the elastic layer on the second primer layer, is included. Therefore, the generations of the defects, which are caused by the generation of the crack on the elastic layer by the deterioration of the heat-resistance synthetic rubber constituting the elastic layer, and the defect of the image fixing, and so on by the stained image and the unevenness of the surface are able to be prevented. At the same time, it is possible to provide a fixing member, which is capable of preventing winding of a transfer paper, with a low cost.

Figure 3:
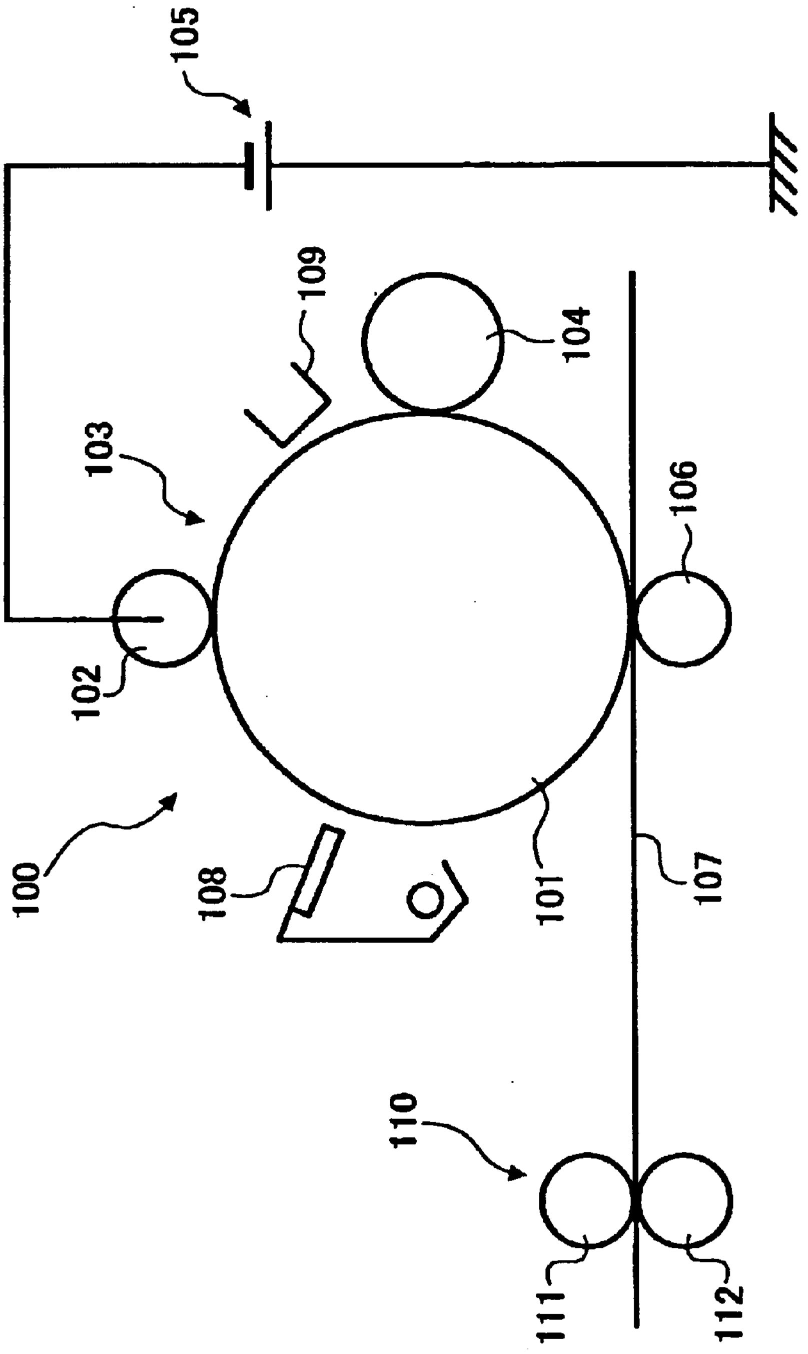
FIG. 3 PRIOR ART
FIG. 3 is an explanatory view for an image forming apparatus of a conventional electrophotography process.
Figure 4:
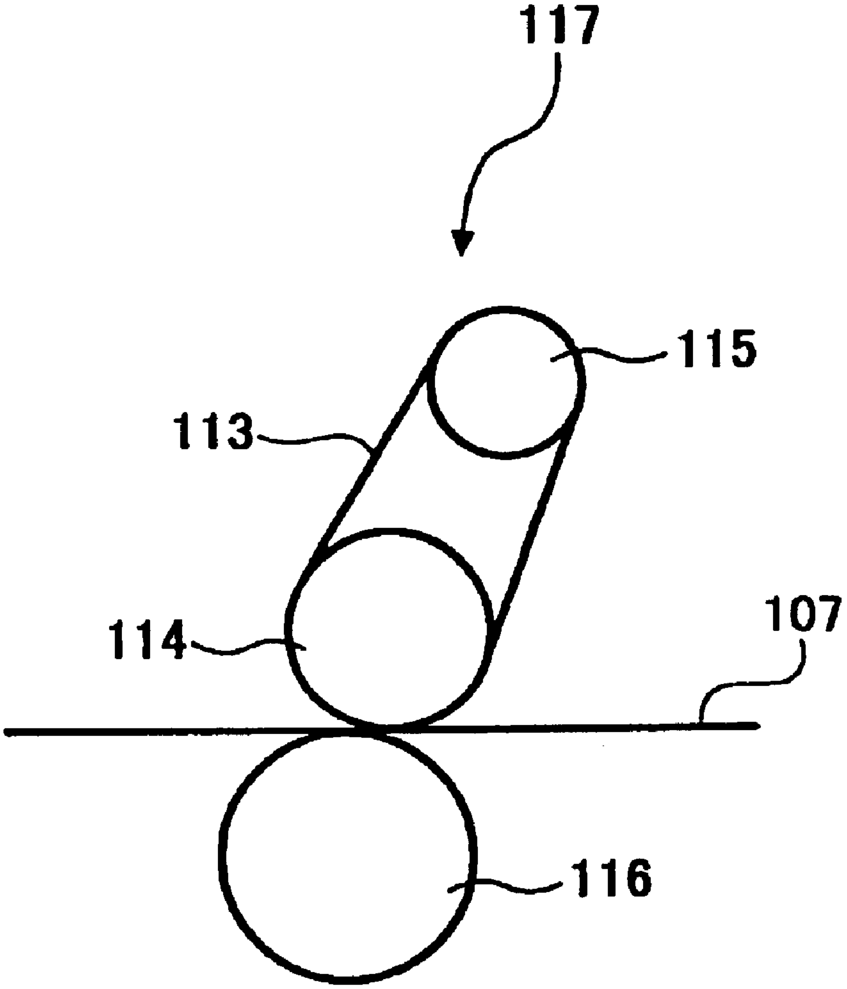
FIG. 4 PRIOR ART
FIG. 4 is an explanatory view for a conventional belt type fixing device.

According to the above-mentioned the first feature, for example, the fixing member can be provided with the image forming apparatus as showing FIGS. 3 and 4. Consequently, since the present invention comprises the fixing member as the above-mentioned, the generations of the defects, which are caused by the generation of the crack on the elastic layer by the deterioration of the heat-resistance synthetic rubber constituting the elastic layer, and the defect of the image fixing, and so on by the stained image and the unevenness of the surface are able to be prevented. Moreover, it is possible to provide the fixing device comprising the fixing member, which is capable of preventing the winding of the transfer paper.

(Embodiment 1)

A fixing roller of the embodiment 1 is formed sequentially by following processes.

① a process for forming the first primer layer by applying and drying primer (DY39-0521 TORAY DOW CORNING CO LTD) on a core consisting of aluminum of 40 mm in diameter.

② a process for forming the elastic layer by applying and vulcanizing solution of silicone resin (DX35-2083 TORAY DOW CORNING CO LTD) in which the starting temperature for the oxidation containing 5% by weight of iron oxide is 341° C. on the first primer layer.

③ a process for forming a second primer layer by applying and drying liquid primer for silicone containing fluorocarbon resin (DU-PONT-MITSUI FLUOROCHEMICALS COMPANY, LTD) on this elastic layer.

④ a process for forming a paint layer by applying and drying dispersion liquid of fluorocarbon resin (PFA345-

HP-J DU-PONT-MITSUI FLUOROCHEMICALS COMPANY, LTD) in which a melting point is 310° C. and a melt flow rate (MFR) prescribed in ASTM D3307 is 3.0 on this second primer layer, and a process for forming the releasing layer by burning this paint layer for 30 minutes by 340° C.

At this point, the starting temperature for the oxidation and the melting point are measured by a measurement of DSC curve with a differential scanning calorimeter (DSC-3100 MAC-SCINECE Co,Ltd). Conditions of the measurement are as follows. ① a temperature: a temperature rising from 50° C. to 450° C. ② a programming rate: 10° C. per minute ③ an ambient atmosphere: air A value of the melt flow rate (MFR) of the fluorocarbon resin constituting the releasing layer is used a representing value measured by the temperature of 372° C. and a load of 5 Kg.

(Embodiment 2)

For a fixing roller of the second embodiment, in the fourth process of above-mentioned first embodiment, fluorocarbon resin (PFA340HP-J DU-PONT-MITSUI FLUOROCHEMICALS COMPANY, LTD) in which a melting point is 310° C. and a melt flow rate (MFR) prescribed in ASTM D3307 is 10.0 are used. Beside these conditions, the fixing roller of the second embodiment is formed as same as the first embodiment.

(Embodiment 3)

For a fixing roller of the third embodiment, in the second process of the above-mentioned first embodiment, silicone resin (DX35-20833 Toray Industries, Inc) in which a starting temperature for the oxidation containing 3% by weight of iron oxide is 320° C. is used. In the fourth process of the first embodiment, a paint layer is formed by applying and drying dispersion liquid of fluorocarbon resin (PFA954HP-Plus DU-PONT-MITSUI FLUOROCHEMICALS COMPAY, LTD) in which a melting point is 300° C. and a melt flow rate (MFR) prescribed in ASTM D3307 is 3.0, and then this applying layer is baked for 30 minutes with 320° C. Beside these conditions, the fixing roller of the third embodiment is formed as same as the first embodiment.

(Embodiment 4)

For a fixing roller of the fourth embodiment, in the second process of the above-mentioned first embodiment, silicone resin (DX35-2083 Toray Industries, Inc) in which a starting temperature for the oxidation containing 5% by weight of iron oxide is 341° C. is used. In the fourth process of the first embodiment, a paint layer is formed by applying and drying dispersion liquid of fluorocarbon resin (PFA945HP-Plus DU-PONT-MITSUI FLUOROCHEMICALS COMPANY, LTD) in which a melting point is 300° C. and a melt flow rate (MFR) prescribed in ASTM D3307 is 3.0, and then this paint layer is baked for 30 minutes with 320° C. Beside these conditions, the fixing roller of the third embodiment is formed as same as the first embodiment.

(Embodiment 5)

For a fixing roller of the fifth embodiment, in the second process of the first embodiment, silicone resin (DX35-2083 Toray Industries, Inc) in which a starting temperature for the oxidation containing 5% by weight of iron oxide is 341° C. is used. In the fourth process of the first embodiment, a paint layer is formed by applying and drying dispersion liquid of fluorocarbon resin (PFA945HP-Plus DU-PONT-MITSUI FLUOROCHEMICALS COMPANY, LTD) in which a melting point is 300° C. and a melt flow rate (MER) prescribed in ASTM D3307 is 3.0, and then this paint layer is baked for 30 minutes with 340° C. Beside these conditions, the fixing roller of the fifth embodiment is formed as same as the first embodiment.

(Embodiment 6)

For a fixing roller of the sixth embodiment, in the second process of the first embodiment, silicone resin (DX35-20823 Toray Industries, Inc) in which a starting temperature for the oxidation containing 3% by weight of iron oxide is 320° C. is used. In the fourth process of the first embodiment, a paint layer is formed by applying and drying dispersion liquid of fluorocarbon resin (PFA940HP-Plus DU-PONT-MITSUI FLUOROCHEMICALS COMPANY, LTD) in which a melting point is 300° C. and a melt flow rate (MER) prescribed in ASTM D3307 is 10.0, and then this paint layer is baked for 30 minutes with 320° C. Beside these conditions, the fixing roller of sixth embodiment is formed as same as the first embodiment.

(Embodiment 7)

For a fixing roller of the seventh embodiment, in the second process of the first embodiment, silicone resin (DX35-2083 Toray Industries, Ltd) in which a starting temperature for the oxidation containing 5% by weight of iron oxide is 341° C. is used. In the fourth process of the first embodiment, a paint layer is formed by applying and drying dispersion liquid of fluorocarbon resin (PFA940HP-Plus DU-PONT-MITSUI FLUOROCHEMICALS COMPANY, LTD) in which a melting point is 300° C. and a melt flow rate (MFR) prescribed in ASTM D3307 is 10.0, and then this paint layer is baked for 30 minutes with 320° C. Beside these conditions, the fixing roller of the seventh embodiment is formed as same as the first embodiment.

(Embodiment 8)

For a fixing roller of the eighth embodiment, in the second process of the first embodiment, silicone resin (DX35-2083 Toray Industries, Inc) in which a starting temperature for the oxidation containing 5% by weight of iron oxide is used. In the fourth process of the first embodiment, a paint layer is formed by applying and drying dispersion liquid of fluorocarbon resin (PFA940HP-Plus DU-PONT-MITSUI FLUOROCHEMICALS COMPANY LTD) in which a melting point is 300° C. and a melt flow rate (MFR) prescribed in ASTM D3307 is 10.0, and then this paint layer is baked for 30 minutes with 340° C. Beside these conditions, the fixing roller of the eighth embodiment is formed as same as the first embodiment.

COMPARATIVE EXAMPLE 1

For a fixing roller of the comparative example 1, in the second process of the first embodiment, silicone resin (DX35-2083 Toray Industries, Inc) in which a starting temperature for the oxidation containing 1% by weight of iron oxide is 300° C. is used. In the fourth process of the first embodiment, fluorocarbon resin (PFA345HP-J DU-PONT-MITSUI FLUOROCHEMICALS COMPAY, LTD) in which a melting point is 310° C. and a melt flow rate (MFR) prescribed in ASTM D3307 is 1.0 is used. Beside these conditions, the fixing roller of the comparative example 1 is formed as same as the first embodiment.

COMPARATIVE EXAMPLE 2

For the fixing roller of the second comparative example, in the second process of the first embodiment, silicone resin (DX35-2083 Toray Industries, Inc) in which a starting temperature for the oxidation containing 3% by weight of iron oxide is 320° C. is used. In the fourth process of the first embodiment, fluorocarbon resin (PFA350HP-J DU-PONT-MITSUI FLUOROCHEMICALS COMPANY, LTD) in which a melting point is 310° C. and a melt flow rate (MFR) prescribed in ASTM D3307 is 1.0 is used. Beside these conditions, the fixing roller of the second comparative example is formed as same as the first embodiment.

COMPARATIVE EXAMPLE 3

For the fixing roller of the third comparative example, in the second process of the first embodiment, silicone resin (DX35-2083 Toray Industries, Inc) in which a starting temperature for the oxidation containing 5% by weight of iron oxide is 341° C. is used. In the fourth process of the first embodiment, fluorocarbon resin (PFA350HP-J DU-PONT-MITSUI FLUOROCHEMICALS COMPAY, LTD) in which a melting point is 310° C. and a melt flow rate (MFR) prescribed in ASTM D3307 is 1.0 is used. Beside these conditions, the fixing roller of the third comparative examples is formed as same as the first embodiment.

COMPARATIVE EXAMPLE 4

For a fixing roller of the fourth comparative example, in the second process of the first embodiment, silicone resin (DX35-2083 Toray Industries, Inc) in which a starting temperature for the oxidation containing 1% by weight of iron oxide is 300° C. is used. In the fourth process of the first embodiment, fluorocarbon resin (PFA345HP-J DU-PONT-MITSUI FLUOROCHEMICALS COMPANY, LTD) in which a melting point is 310° C. and a melt flow rate (MFR) prescribed in ASTM D3307 is 3.0 is used. Beside these conditions, the fixing roller of the fourth comparative example is formed as same as the first embodiment.

COMPARATIVE EXAMPLE 5

For a fixing roller of the fifth comparative example, in the second process of the first embodiment, silicone resin (DX35-2083 Toray Industries, Inc) in which a starting temperature for the oxidation containing 3% by weight of iron oxide is 320° C. is used. In the fourth process of the first embodiment, fluorocarbon resin (PFA345HP-J DU-PONT-MITSUI FLUOROCHEMICALS COMPANY, LTD) in which a melting point is 310° C. and a melt flow rate (MFR) prescribed in ASTM D3307 is 3.0 is used. Beside these conditions, the fixing roller of the fifth comparative example is formed as same as the first embodiment.

COMPARATIVE EXAMPLE 6

For a fixing roller of the sixth comparative example, in the second process of the first embodiment, silicone resin (DX35-2083 Toray Industries, Inc) in which a starting temperature for the oxidation containing 3% by weight of iron oxide is 320° C. is used. In the fourth process of the first embodiment, fluorocarbon resin (PFA340HP-J DU-PONT-MITSUI FLUOROCHEMICALS COMPANY, LTD) in which a melting point is 310° C. and a melt flow rate (MFR) prescribed in ASTM D 3307 is 10.0 is used. Beside these conditions, the fixing roller of the sixth comparative example is formed as same as the first embodiment.

COMPARATIVE EXAMPLE 7

For a fixing roller of the seventh embodiment, in the second process of the first embodiment, silicone resin (DX35-2083 Toray Industries, Inc) in which a starting temperature for the oxidation containing 1% by weight of iron oxide is 300° C. is used. In the fourth process of the first embodiment, fluorocarbon resin (PFA340HP-J DU-PONT-MITSUI FLUOROCHEMICALS COMPANY, LTD) in which a melting point is 310° C. and a melt flow rate prescribed in ASTM D 3307 is 10.0 is used. Beside these conditions, the fixing roller of the seventh comparative example is formed as same as the first embodiment.

COMPARATIVE EXAMPLE 8

For a fixing roller of the eighth comparative example, in the second process of the first embodiment, silicone resin (DX35-2083 Toray Industries, Inc) in which a starting temperature for the oxidation containing 1% by weight of iron oxide is 300° C. is used. In the fourth process of the first embodiment, fluorocarbon resin (PFA950HP-Plus DU-PONT-MITSUI FLUOROCHEMICALS COMPANY, LTD) in which a melting point is 300° C. and a melt flow rate prescribed in ASTM D3307 is 1.0 is used. Beside these conditions, the fixing roller of the eight comparative example is formed as same as the first embodiment.

COMPARATIVE EXAMPLE 9

For a fixing roller of the ninth comparative example, in the second process of the first embodiment, silicone resin (DX35-2083 Toray Industries, Inc) in which a starting temperature for the oxidation containing 3% by weight of iron oxide is 320° C. is used. In the fourth process of the first embodiment, fluorocarbon resin (PFA950HP-Plus DU-PONT-MITSUI FLUOROCHEMICALS COMPANY, LTD) in which a melting point is 300° C. and a melt flow rate (MFR) prescribed in ASTM D3307 is 1.0 is used. Beside these conditions, the fixing roller of the ninth comparative example is formed as same as the first embodiment.

COMPARATIVE EXAMPLE 10

For a fixing roller of the tenth comparative example, in the second process of the first embodiment, silicone resin (DX35-2083 Toray Industries, Inc) in which a starting temperature for the oxidation containing 5% by weight of iron oxide is 341° C. is used. In the fourth process of the first embodiment, fluorocarbon resin (PFA950HP-Plus DU-PONT-MITSUI FLUOROCHEMICALS COMPANY, LTD) in which a melting point is 300° C. and a melt flow rate (MFR) prescribed in ASTM D 3307 is 1.0 is used. Beside these conditions, the fixing roller of the tenth comparative example is formed as same as the first embodiment.

COMPARATIVE EXAMPLE 11

For a fixing roller of the eleventh comparative example, in the second process, silicone resin (DX35-2083 Toray Industries, Inc) in which a starting temperature for the oxidation containing 1% by weight of iron oxide is 300° C. is used. In the fourth process of the first embodiment, fluorocarbon resin (PFA945HP-Plus DU-PONT-MITSUI FLUOROCHEMICALS COMPANY, LTD) in which a melting point is 300° C. and a melt flow rate (MFR) prescribed in ASTM D3307 is 3.0 is used. Beside these conditions, the fixing roller of the eleventh comparative example is formed as same as the first embodiment.

COMPARATIVE EXAMPLE 12

For a fixing roller of the twelfth comparative example, in the second process of the first embodiment, silicone resin (DX35-2083 Toray Industries, Inc) in which a starting temperature for the oxidation containing 1% by weight of iron oxide is 300° C. is used. In the fourth process of the first embodiment, fluorocarbon resin (PFA940HP-Plus DU-PONT-MITSUI FLUOROCHEMICALS COMPANY, LTD) in which a melting point is 300° C. and a melt flow rate (MFR) prescribed in ASTM D3307 is 10.0 is used. Beside these conditions, the fixing roller of the twelfth comparative example is formed as same as the first embodiment.

Evaluations of following evaluation items are carried out for the fixing rollers (fixing members), which were produced by the embodiments 1 to 8 and the comparative embodiments 1 to 12.

α: with or without crack evaluation criterion: with or without are evaluated by visual evaluation.

β: film formation performance of the releasing layers evaluation criterion: the evaluations are divided into 5 ranks from 1 to 5, from bad to excellent. Ranks above 3 are levels for an actual use without a problem.

γ: image defect (surface performance)

evaluation criterion: the evaluations are divided into 5 ranks from 1 to 5, form bad to excellent. Ranks above 3 are levels for an actual use without a problem.

Results of the evaluations are shown in the following table 1.

TABLE 1

| | α | β | γ |
|---|---|---|---|
| First embodiment | without | 3 | 4 |
| Second embodiment | without | 5 | 5 |
| Third embodiment | without | 4 | 5 |
| Fourth embodiment | without | 4 | 5 |
| Fifth embodiment | without | 4 | 5 |
| Sixth embodiment | without | 5 | 5 |
| Seventh embodiment | without | 5 | 5 |
| Eighth embodiment | without | 5 | 5 |
| First comparative example | with | 1 | 1 |
| Second comparative example | with | 1 | 1 |
| Third comparative example | without | 1 | 1 |
| Fourth comparative example | with | 3 | 2 |
| Fifth comparative example | with | 3 | 2 |
| Sixth comparative example | with | 5 | 2 |
| Seventh comparative example | with | 5 | 2 |
| Eighth comparative example | with | 2 | 1 |
| Ninth comparative example | with | 2 | 2 |
| Tenth comparative example | without | 2 | 2 |
| Eleventh comparative example | with | 4 | 2 |
| Twelfth comparative example | with | 5 | 2 |

The following results can be found out from the above table 1.

(1) The crack on the elastic layer is not generated, when the condition that the melting point (the starting temperature for the melting) of the fluorocarbon resin constituting the elastic layer is at least 20° C. lower than the starting temperature for the oxidation of the heat-resistance synthetic rubber constituting the elastic layer is met, and as long as a baking temperature of this fluorocarbon resin does not exceed the starting temperature for the oxidation of the heat-resistance synthetic rubber.

(2) The film formation performance is ensured when the melt flow rate (MFR) of the fluorocarbon resin constituting the releasing layer is more than 3 grams per 10 minutes, and the baking temperature of this fluorocarbon resin is at least 20° C. higher than the melting point of the fluorocarbon resin.

(3) When the film n performance is not good condition, even though, polishing or grinding is conducted by a secondary processing, a dent such as a hole, and so on is generated. Therefore, an appropriate surface roughness (Rz: an average roughness of 10 points) cannot be received, and the image defect is generated. When the crack is generated, the toner stays in the part where the crack is generated so that the defects such as the image-fixing defect, and so on by the stained image and the unevenness of the surface are generated.

According to the above-mentioned fixing members, the melting point of the fluorocarbon resin constituting the releasing layer is set to be at least 20° C. lower than the starting temperature for the oxidation of the heat-resistance-synthetic rubber constituting the elastic layer, and the releasing layer is baked at a temperature, which is higher than the melting point of the fluorocarbon resin, and the baking temperature, which does not exceed the starting temperature for the oxidation of the heat-resistance synthetic rubber composing the elastic layer. Consequently, the generation of the crack on the elastic layer caused by the deterioration of the heat-resistance synthetic rubber constituting the elastic layer can be prevented, and the generations of the defects such as the image fixing defect, and so on by the stained image and the unevenness of the surface are also able to be prevented. Moreover, it is possible to provide the fixing member, which is capable of preventing the winding of the transfer paper, with the low cost.

According to the above-mentioned fixing member, the melt flow rate (MFR) of the fluorocarbon resin constituting the releasing layer if the flat surface by ensuring the good film performance, and also it is possible to present the generation of the defects such as the defect of the image, and so on.

According to the above-mentioned fixing member, the releasing layer baked at a temperature of at least 20° C. higher than the starting temperature for the melting of the fluorocarbon resin constituting the releasing layer. Therefore, the particles of the fluorocarbon resin are melted and bonded closely, and the surface performance is further improved, and as a result the generations of defects such as the image defects, and so on can be further prevented.

According to the above-mentioned fixing member, the process that the paint layer of the fluorocarbon resin is formed by applying the powdered paint or the dispersion liquid of the fluorocarbon resin constituting the melting point, which is at least 20° C. lower than the starting temperature for the oxidation of the heat-resistance synthetic rubber constituting the elastic layer on the second primer layer, are included. Therefore, the generations of defects such as the image fixing defect, and so on by the stained image and the unevenness of the surface, which are caused by the generation of the crack on the elastic layer caused by the deterioration of the heat-resistance synthetic rubber constituting the elastic layer, can be prevented. It is also possible to provide the fixing member, which is able to prevent the winding of the transfer paper, with the low cost.

According to the above-mentioned method for producing the fixing member, it is possible to present the generations of the defects such as the image fixing, and so on caused by the stained image and the unevenness of the surface, which are caused by the generation of the crack on the elastic layer by the deterioration of the heat-resistance synthetic rubber constituting the elastic layer. It is also possible to provide the fixing member, which is able to prevent the winding of the transfer paper, with the low cost.

What is claimed is:

1. A fixing member, comprising:

a substrate;

an elastic layer comprising a heat-resistant synthetic rubber; and a mold releasing layer comprising a fluorocarbon resin, said elastic layer and said mold releasing layer provided in sequence on said substrate; wherein a melting point of the fluorocarbon resin is at least 20° C. lower than a temperature for starting an oxidation of the heat resistant synthetic rubber, said releasing layer is baked at a temperature, which is higher than the melting point of the fluorocarbon resin, and a heating temperature which does not exceed the starting temperature for the oxidation of the heat resistant synthetic rubber, and a melt flow rate (MFR) of the flourocarbon resin being more than 3 grams per 10 minutes.

2. A fixing member according to claim 1, wherein a major component of the heat-resistant synthetic rubber is silicone rubber or fluorosilicone rubber.

3. A fixing member according to claim 1, wherein the fluorocarbon resin has a melting point in a range of 270° C. to 285° C.

4. A fixing member according to claim 1, wherein the fluorocarbon resin has a melting point in a range of 245° C. to 280° C.

5. A fixing member according to claim 1, wherein the fluorocarbon resin has a melting point in a range of 278.9° C. to 287.2° C.

6. A fixing member according to claim 1, wherein the fluorocarbon resin has a melting point less than 220° C.

7. A fixing member according to claim 1, wherein said releasing layer is heated at a temperature which is at least 20° C. higher than a temperature for starting a melting of the fluorocarbon resin.

8. A fixing member according to claim 1, wherein said substrate is a roller comprising a metal.

9. A fixing member according to claim 8, wherein said metal is aluminum, stainless-steel, brass, or iron.

10. A fixing member according to claim 1, wherein said substrate is formed by (1) a sheet or an endless belt comprising a metal, (2) a sheet or an endless belt comprising a heat-resistant resin, or (3) a laminated sheet or a laminated endless belt recited in the above (1) or (2).

11. A fixing member according to claim 10 wherein said metal is stainless-steel or nickel.

12. A fixing member according to claim 10 wherein said heat-resistant resin is polyamide or polyamideimide.

13. A fixing member of claim 1, wherein said elastic layer consists of said heat-resistant synthetic rubber.

14. A fixing member of claim 1, wherein said mold releasing layer consists of said fluorocarbon resin.

15. A fixing member of claim 1, wherein said elastic layer consists of said heat-resistant synthetic rubber and said mold releasing layer consists of said fluorocarbon resin.

16. An image forming apparatus comprising:

a fixing member including a substrate;

an elastic layer comprising a heat-resistant synthetic rubber and which is provided on said substrate; and a releasing layer comprising a fluorocarbon resin and which is provided on said elastic layer;

wherein a melting point of the fluorocarbon resin is at least 20° C. lower than a temperature for starting an oxidation of the heat-resistant rubber, and said releasing layer being baked at a temperature which is higher than the melting point of the fluorocarbon resin, and a heating temperature which does not exceed the starting temperature for the oxidation of the heat-resistant synthetic rubber, and a melt flow rate (MFR) of the fluorocarbon resin being more than 3 grams per 10 minutes.

17. An image forming apparatus of claim 16, wherein said elastic layer consists of said heat-resistant synthetic rubber.

18. An image forming apparatus of claim 16, wherein said releasing layer consists of said fluorocarbon resin.

19. An image forming apparatus of claim 16, wherein said elastic layer consists of said heat-resistant synthetic rubber and said releasing layer consists of said fluorocarbon resin.

* * * * *